United States Patent [19]
Williams et al.

[11] Patent Number: 5,973,899
[45] Date of Patent: Oct. 26, 1999

[54] AUTOMATED POWER FEEDER RESTORATION SYSTEM AND METHOD

[75] Inventors: Bradley R. Williams, Brush Prairie; C. Thomas Eyford, III, Vancouver, both of Wash.; Dean H. Miller, Portland, Oreg.

[73] Assignee: PacifiCorp, Portland, Oreg.

[21] Appl. No.: 09/151,383

[22] Filed: Sep. 10, 1998

[51] Int. Cl.⁶ .................................................. H02H 7/26
[52] U.S. Cl. ............................... 361/72; 361/65; 361/67
[58] Field of Search ................................. 361/71, 72, 63, 361/64, 65, 66, 67, 68, 93.9, 115; 702/58, 59, 64, 65, 183, 184

[56] References Cited

U.S. PATENT DOCUMENTS

| | | | |
|---|---|---|---|
| 3,571,661 | 3/1971 | Schultz et al. | 317/22 |
| 3,668,351 | 6/1972 | Walbrun et al. | 200/144 |
| 3,739,229 | 6/1973 | Moran | 317/22 |
| 4,476,511 | 10/1984 | Saletta et al. | 361/96 |
| 5,195,095 | 3/1993 | Shah | 371/15.1 |
| 5,303,112 | 4/1994 | Zulaski et al. | 361/67 |
| 5,305,174 | 4/1994 | Morita et al. | 361/63 |
| 5,341,268 | 8/1994 | Ishiguro et al. | 361/62 |
| 5,513,061 | 4/1996 | Gelbien et al. | 361/63 |
| 5,543,995 | 8/1996 | Kumagi et al. | 361/65 |
| 5,550,476 | 8/1996 | Lau et al. | 324/522 |
| 5,579,195 | 11/1996 | Nishijima et al. | 361/62 |
| 5,600,526 | 2/1997 | Russell et al. | 361/65 |

OTHER PUBLICATIONS

"Operating Description for Automatic Transfer Panel", S&C Electric Company, Chicago, Ill. Jan. 12, 1978, Doc. No. CDR–1610, Rev. 2, pp. 1–18.

"Automatic P–T Switches Sectionalize Rural Faults", R.A. Michalik, Electric Light and Power, May, 1965, pp. 64–67.

"A New Concept of Control Panels for Automatic Switching of Power System Feeders", M.C. Harman, Nov., 1956, AIEE, New York, NY, Paper No. CP 57–50, pp. 1–6.

Primary Examiner—Albert W. Paladini
Assistant Examiner—Kim Huynh
Attorney, Agent, or Firm—Stoel Rives LLP

[57] ABSTRACT

A feeder restoration method starts in response to an overcurrent fault on a feeder (22) that causes a circuit breaker (42) to trip open, reclose once, trip again, and attempt to reclose again. During the time period between the first and second reclosings, any remote sectionalizing switches (46) on the faulty feeder are opened if they have also sensed the overcurrent fault, and a substation processor (50) evaluates the status of the faulty feeder and an alternate feeder (32, 34). After the second trip of the circuit breaker, the processor verifies whether the remote sectionalizing switch was closed and a remote tie switch (40) to the alternate feeder was open. If the circuit breaker locks open, the substation processor determines whether the remote sectionalizing switch did not sense the overcurrent condition (which indicates that the fault is between the circuit breaker and the sectionalizing switch) or simply failed to open. The processor then verifies that the remote sectionalizing switch voltage is zero and opens the switch. The processor next determines whether the alternate feeder and its associated transformer (30) and circuit breaker (44) can pick up the dropped load, and if they can, the substation processor modifies the alternate circuit breaker trip current settings to accommodate the new total load plus a surge current and closes the remote tie switch to transfer the load to the alternate feeder.

18 Claims, 5 Drawing Sheets

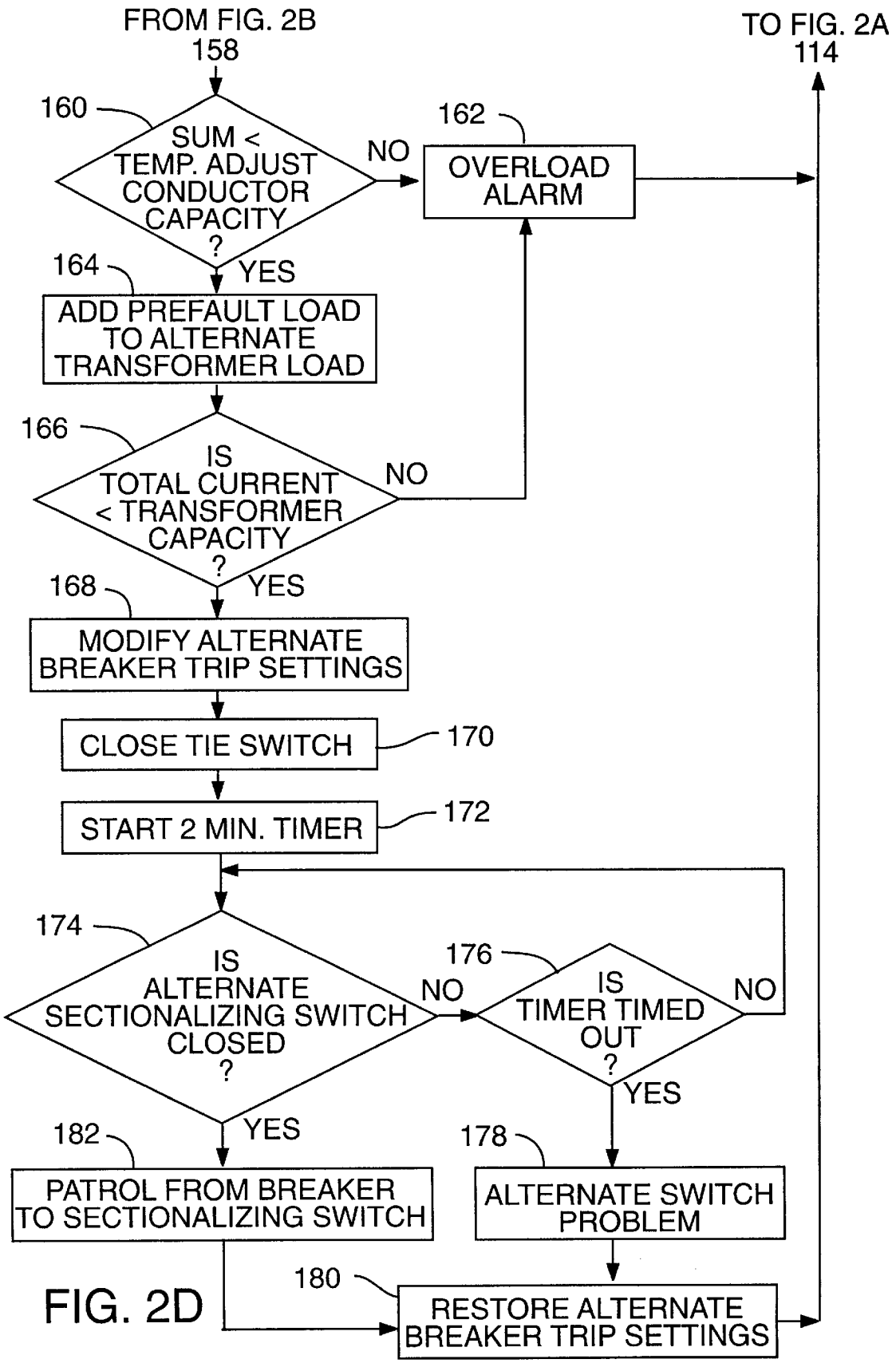

AUTOMATED POWER FEEDER RESTORATION SYSTEM AND METHOD

TECHNICAL FIELD

The present invention relates to electrical power transmission and distribution systems and more particularly to a system and method for restoring power to a load in response to a conductor ("feeder") fault, such as an overcurrent condition.

BACKGROUND OF THE INVENTION

There are previously known devices and methods for restoring electrical power to a load following a fault. In particular, U.S. Pat. No. 5,303,112 for FAULT DETECTION METHOD AND APPARATUS and U.S. Pat. No. 3,668,351 for SECTIONALIZING AND PROTECTIVE APPARATUS FOR SINGLE HOUSE TRANSFORMER describe typical electrical power distribution systems in which various customers and users (hereafter "loads") are supplied with electricity in networks such that power is distributed to the loads from more than one system network path or more than one source. In such distribution systems, faults may be isolated by employing sectionalizing switches while maintaining power delivery to the loads that are not in the immediate vicinity of the faulty sections, i.e., where the fault occurs. To achieve this fault isolation, various devices are arranged throughout the distribution system at appropriate locations to efficiently provide for the interruption and isolation of faults. These devices include fuses, circuit breakers, remote sectionalizing switches, and remotely and locally operated power distribution switches. Conventional power distribution systems commonly employ stand-alone, local logic and sensing devices for restoring power to loads following a fault.

For example, a conventional power distribution system receives at substations remotely produced high voltage through transmission lines. At a first substation, the high voltage is transformed by a transformer to a lower voltage for distribution through overhead or underground first feeder sections and associated transformers to a first set of loads. Likewise, a second substation produces a lower voltage for distribution through overhead or underground second feeder sections and associated transformers to a second set of loads. The first feeder sections are isolated from the second feeder sections by a remotely located, normally open ("NO") tie switch.

The first and second substations include associated first and second circuit breakers, which receive the lower voltage from the respective transformers and deliver the lower voltage through the respective feeder sections to the respective loads. Conventional circuit breakers include local controllers that sense a predetermined sequence of reclosing cycles in the presence of locally sensed overcurrents whereby delivery of electrical power is interrupted via the breaking of the circuit for predetermined intervals followed by the reclosing of the circuit. The reclosing sequence continues until either the fault is cleared or a predetermined number of reclosing operations have taken place, whereupon the circuit breaker locks out to continuously open the circuit until appropriate action can be taken by maintenance personnel to repair the circuit. In this manner, momentarily occurring overcurrents or fault conditions that are self-clearing allow the restoration and maintenance of power delivery to the loads without permanent opening or lock out of the circuit.

Remotely located along the first feeder sections between the first set of loads is a normally closed ("NC") sectionalizing switch, which is arranged to count the number of first circuit breaker reclosing operations. Likewise, remotely located along the second feeder sections between the second set of loads is another NC sectionalizing switch that is arranged to count the number of second circuit breaker reclosing operations. After a predetermined number of counts, for example, three, the relevant remote sectionalizing switch has sufficient local intelligence to open its switch during its associated circuit breaker open time period to isolate a particular fault and allow the circuit breaker to successfully reclose. At other locations, such as in branch sections of feeder lines, fuses may be provided and coordinated with the other protective devices to sense overcurrents and faults so as to interrupt current before the breakers, and/or sectionalizing switches can operate. Additionally, automated or manual distribution switches are provided at various points in the distribution network to provide suitable isolation, sectionalizing, and rerouting of power via different sources.

Information and control data regarding the operation, sensing, and control of the power distribution system is typically provided by a controller locally associated with each circuit breaker, sectionalizing switch, distribution switch, or circuit point. Data communication to system control processors in associated substations is typically via suitable communication channels, such as hardwires, radio, fiberoptics, telephone lines, or powerline carriers. The information and control data include the closed/lockout state of the breakers, closed/open state of the tie switch and sectionalizing switches, actuating command data for the above breakers and switches, and the sensed voltage and current at associated points in the power distribution system.

While particular breaker, switch, and parameter information is typically available throughout the power distribution system, presently available local control methods are not coordinated and can, therefore, erroneously respond to feeder faults as a result of magnetizing inrush currents, cold-load pickup, backfeed conditions, and overloads caused by corrective actions. Thus, in conventional systems, the location and cause of a feeder fault may not be confidently known via the information received at a control site.

What is needed, therefore, is an overall coordinated method of sensing and operating the various components in a power distribution system to efficiently locate, isolate, and restore the system after the occurrence of a feeder fault or overcurrent condition. In particular, what is needed is a feeder restoration method that provides faster power restoration to a greater number of loads than is provided by prior methods.

SUMMARY OF THE INVENTION

An object of this invention is, therefore, to provide an apparatus and a method for locating, isolating, and restoring power to loads in a power distribution system after the occurrence of a feeder fault or overcurrent condition.

Another object of this invention is to provide a feeder restoration method that provides faster power restoration to a greater number of loads than is provided by prior methods.

An automatic feeder restoration method of this invention utilizes distributed microprocessor-based logic and sensing distributed throughout a power distribution system. The feeder restoration method starts operation in response to an overcurrent condition that causes a circuit breaker to trip, reclose once, trip again, and attempt to reclose again. During the time period between the first and second reclosing, any sectionalizing switches on the affected circuit are commanded to open if they have also sensed the overcurrent condition. It is during this time period that the distributed processor system evaluates the status of the affected feeder and its alternate feeders.

The feeder restoration method includes substation processors for interrogating the remote circuit devices to determine a fault location, verifying proper operation of any sectionalizing devices, and restoring service to as many customers as possible.

Restoring power to a feeder circuit proceeds according to the following simple example for a circuit breaker and sectionalizing switch interconnectable by a tie switch to an alternate circuit breaker and sectionalizing switch:

After the second trip of the circuit breaker, a relevant one of the substation processors verifies whether the feeder circuit was operating normally (sectionalizing switch closed and tie switch open) and then waits for the circuit breaker to attempt a final reclosure. If the circuit breaker closes and holds, the processor polls a sectionalizing switch controller to determine whether it sensed the overcurrent condition and opened its associated sectionalizing switch. If it did, the processor issues an order to patrol the feeder circuit from the sectionalizing switch to the tie switch. Otherwise, an "operation problem" alarm is issued.

If instead the circuit breaker locks open, the processor determines whether the sectionalizing switch did not sense the overcurrent condition (which indicates that the fault is between the sectionalizing switch and the circuit breaker) or the sectionalizing switch simply failed to open (in which case the fault location is unknown). To accomplish this determination, the processor interrogates the sectionalizing switch controller to verify that the sectionalizing switch, which monitors the line voltage, is sensing a zero voltage. If the switch controller responds that switch voltage is zero and the switch is closed (which verifies that the system is switched normally, the switch controller is functioning, and communication with the switch controller is normal), the processor then instructs the switch controller to open the sectionalizing switch. As a double-check, the distance to the fault condition (calculated by the circuit breaker controller from the circuit breaker fault voltage and current readings) is checked against the known distance from the circuit breaker to the sectionalizing switch. If the calculated fault distance is significantly greater than the known breaker-to-switch distance, the process is aborted.

If, however, the fault location is calculated to be between the circuit breaker and the sectionalizing switch, the processor determines whether the alternate feeder can pick up the dropped load beyond the now open sectionalizing switch. If the status of the alternate feeder is normal (alternate circuit breaker and alternate sectionalizing switch both closed), the processor adds the prefault sectionalizing switch current (obtained by referencing a stored table of previous current values at that location) to the present alternate feeder load current and determines whether the alternate feeder has the capacity to pick up the load. If it can, the processor instructs a breaker controller associated with the alternate circuit breaker to modify its trip current settings to accommodate the new total load plus surge current, instructs a tie switch controller to close the tie switch, and issues an order to patrol the dead feeder from the circuit breaker to the sectionalizing switch. The alternate circuit breaker settings are returned to normal after the tie switch is closed.

This invention is extendable to restoration feeder loads in power distribution systems including two sectionalizing switches in series with multiple tie switches connected to multiple associated power sources.

Additional objects and advantages of this invention will be apparent from the following detailed description of a preferred embodiment thereof that proceeds with reference to the accompanying drawings.

BRIEF DESCRIPTION OF THE DRAWINGS

FIGS. 2A, 2B, 2C, and 2D are logic flow diagrams each depicting portions of a feeder restoration process of this invention.

DETAILED DESCRIPTION OF A PREFERRED EMBODIMENT

Figure 1:
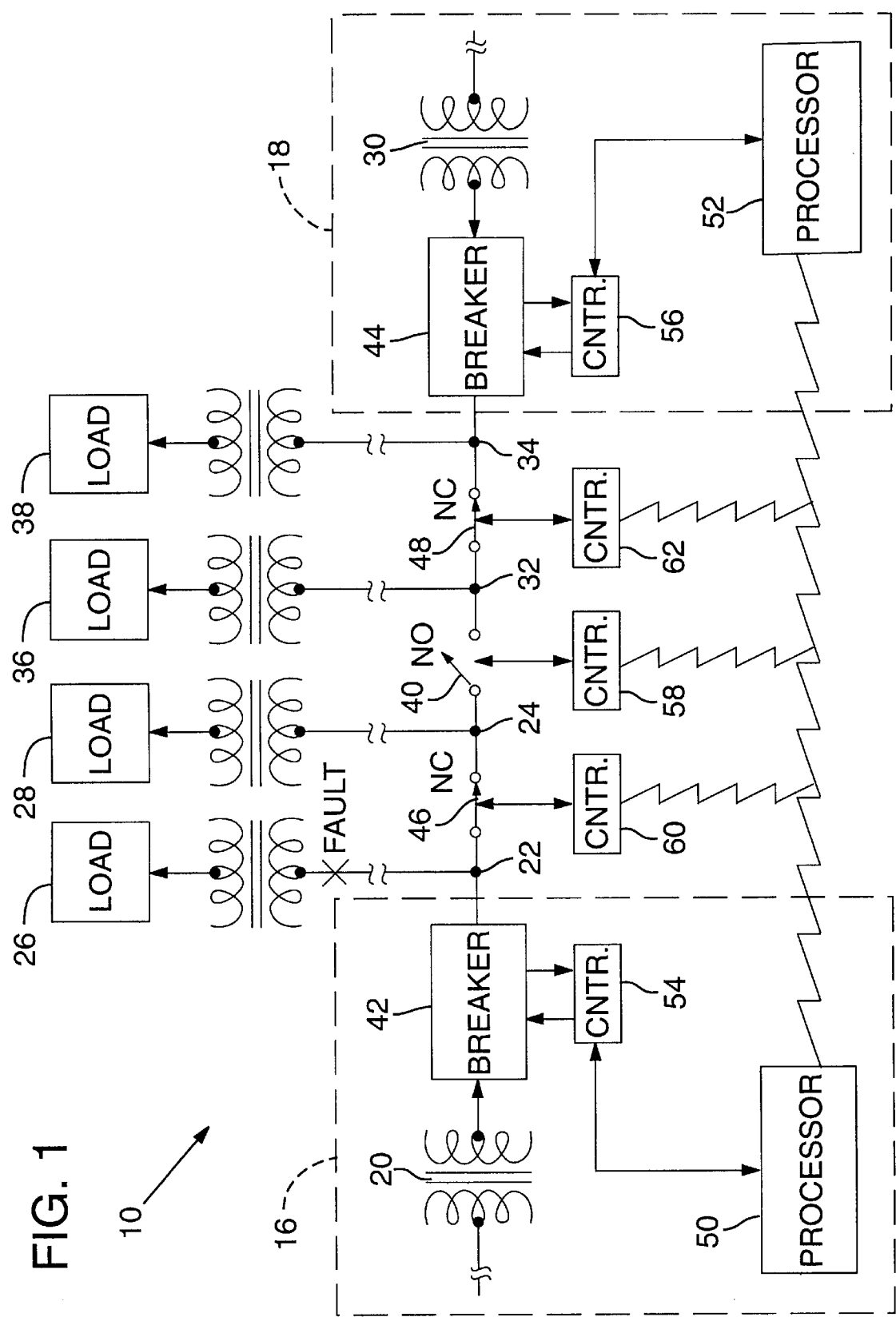
FIG. 1 is a simplified schematic "one-line" diagram of an electrical power distribution system controlled by a distributed processing control system of this invention.

FIG. 1 shows a power distribution system 10 of this invention that receives remotely produced high voltage from a transmission line, or transmission lines at local substations, such as a substation 16 and a substation 18. At substation 16, for example, the transmission voltage energizes the primary windings of a three-phase transformer 20, or a bank of such transformers, the secondary windings of which produce a lower voltage for distribution through overhead or underground feeder sections 22 and 24 and associated transformers to loads 26 and 28. Likewise, substation 18 produces a lower voltage for distribution through overhead or underground feeder sections 32 and 34 and associated transformers to loads 36 and 38. Feeder sections 22 and 24 are isolated from feeder sections 32 and 34 by a normally open ("NO") tie switch 40.

Substations 16 and 18 typically include associated circuit breakers 42 and 44, which receive the lower voltage from respective transformers 20 and 30 and deliver the lower voltage through the distribution system to loads 26, 28, 36, and 38.

Located between circuit breaker 42 and load 28 is a normally closed ("NC") sectionalizing switch 46, which is arranged to count the number of circuit breaker 42 reclosing operations. Likewise, located between circuit breaker 44 and load 36 is an NC sectionalizing switch 48 that is arranged to count the number of circuit breaker 44 reclosing operations. After a predetermined number of counts, for example, three, the relevant sectionalizing switch opens during its associated circuit breaker open time period to isolate a particular fault and allow the circuit breaker to successfully reclose. At other locations, such as in branch sections of feeder lines, fuses may be provided and coordinated with the other protective devices to sense overcurrents and faults so as to interrupt current before the breakers, and/or sectionalizing switches can operate. Additionally, automated or manual distribution switches are provided at various points in the distribution network to provide suitable isolation, sectionalizing, and rerouting of power via different sources.

Information and control data regarding power distribution system 10 operation, sensing, and control is provided by a controller associated with each circuit breaker, sectionalizing switch, distribution switch, or circuit point. Data communication to system control processors in associated substations is via suitable communication channels, such as hardwires, radio, fiberoptics, telephone lines, or powerline carriers. In power distribution system 10, substations 16 and 18 include respective processors 50 and 52 and breaker controllers 54 and 56. Also, tie switch 40 and sectionalizing switches 46 and 48 include respective switch controllers 58, 60, and 62. Data communication is preferably hardwired within the substations but is preferably provided between processors 50 and 52 and switch controllers 58, 60, and 62 by radio links 64 (shown as jagged lines). The information and control data include the closed/lockout state of breakers 42 and 44, closed/open state of tie switch 40 and sectionalizing switches 46 and 48, actuating command data for the above breakers and switches, and the sensed voltage and current at associated points in power distribution system 10. Remote control of power distribution system 10 is available through remote terminal units (not shown) that are connectable to processors 50 and 52 or to any of the breakers and switches.

The feeder restoration method of this invention automatically controls sectionalizing switches 46 and 48 and tie switch 40 to maintain power to as many of loads 26, 28, 36, and 38 as possible following a fault on one of feeder sections 22, 24, 32, and 34. This invention further ensures that a control system failure will not disrupt power to more loads than would be affected without the invention.

Circuit breakers 42 and 44 are preferably conventional fault-interrupting devices that include breaker controllers 54 and 56 for sensing and controlling the associated circuit breaker. Breaker controllers 54 and 56 cause their associated circuit breaker to open and close in a predetermined sequence in response to sensing a fault, typically an overcurrent condition through the circuit breaker. If the fault is permanent, the sequence ends by opening the circuit breaker, a condition referred to a locked-out breaker. If the fault is not permanent, the sequence ends with the circuit breaker closed.

Sectionalizing switches 46 and 48 are conventional motor-operated switches that include associated switch controllers 60 and 62, which open an associated switch in response to sensing a deenergized feeder after sensing a fault current in the feeder. Sectionalizing switches 46 and 48 cannot interrupt a fault current, but can open after the associated breaker deenergizes the feeder.

Processors 50 and 52 in respective substations 16 and 18 are microprocessor-based controllers that execute feeder restoration processes of this invention as described with reference to FIG. 1 and FIGS. 2A to 2D.

Figure 2A:
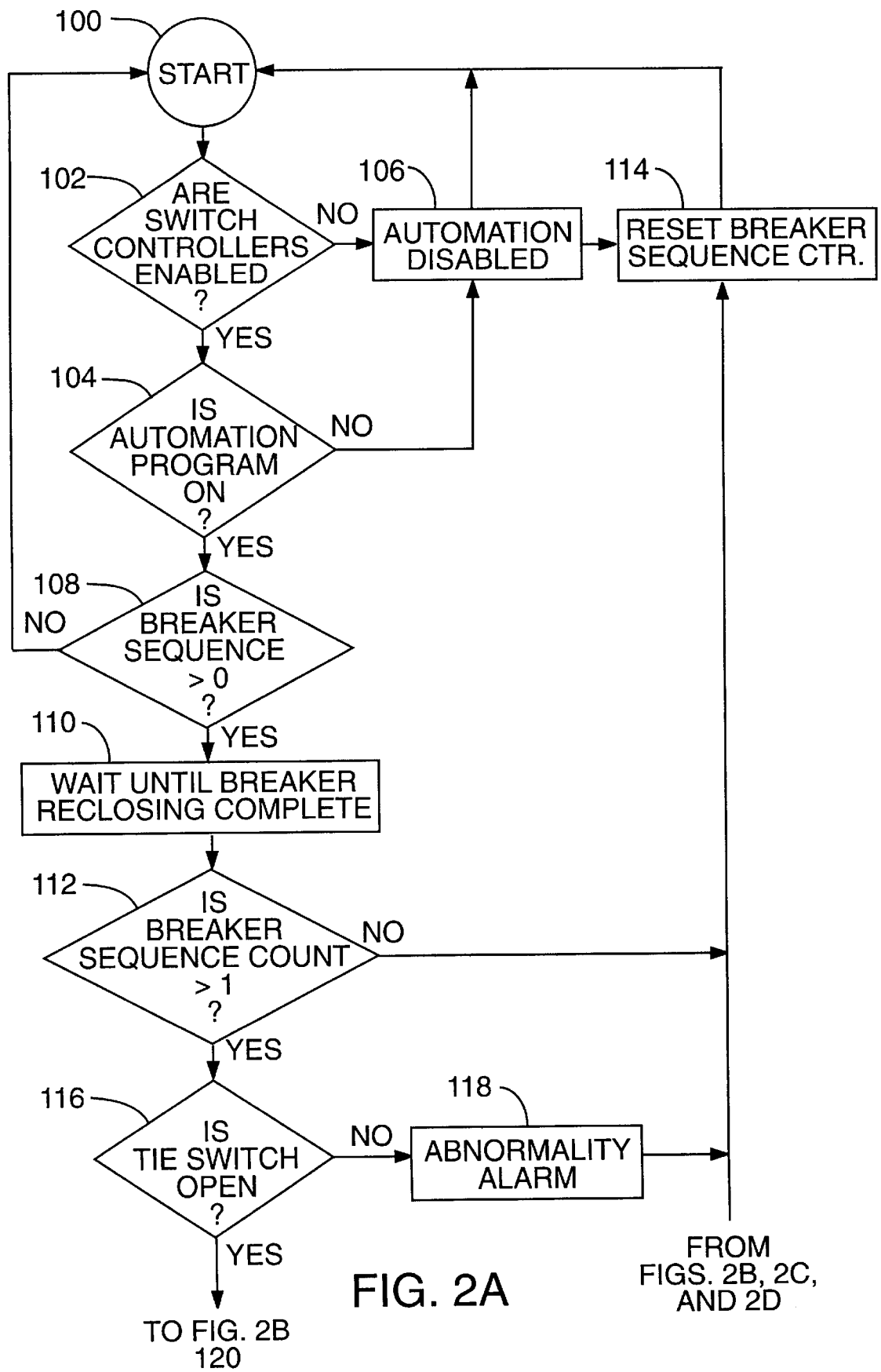

FIG. 2A shows an initial portion of a logic flow diagram of a feeder restoration control process that executes under control of processor 50 in substation 16.

A start block 100 represents a normal, non-fault operating condition for power distribution system 10.

A switch controller decision block 102 represents processor 50 checking sectionalizing switch controller 60 and tie switch controller 58 to determine whether they are in service.

A processor decision block 104 represents determining whether processor 50 is ready to automatically execute the feeder restoration process of this invention.

An alarm block 106 represents providing an alarm to an operator if either block 102 or 104 is false.

A circuit breaker decision block 108 represents checking breaker controller 54 to determine whether circuit breaker 42 has tripped open (indicated by a breaker sequence count greater than zero), and if it has not, the feeder restoration process returns to start block 100.

However, if circuit breaker 42 has tripped open, a delay block 110 represents allowing circuit breaker 42 time to reclose.

A circuit breaker decision block 112 represents checking breaker controller 54 to determine whether circuit breaker 42 has undergone more than one trip and reclose sequence, which indicates that the fault is permanent. However, only one trip and reclose sequence indicates that the fault was transient or that a permanent fault was cleared by a branch feeder fuse.

If circuit breaker decision block 112 returns a false response, a reset block 114 represents resetting the breaker sequence counter to zero. Resetting the sequence counter prevents the feeder restoration process from restarting the sequence for the same event. The process responds by returning to start block 100.

However, if circuit breaker decision block 112 determines that circuit breaker 42 has undergone more than one trip and reclose cycle, a tie switch decision block 116 represents processor 50 interrogating switch controller 58 to determine whether tie switch 40 is open, which is its normal state.

However, if tie switch 40 is closed, an alarm block 118 represents sending an "abnormal system" alarm to the operator and returning the feeder restoration process to start block 100.

Figure 2B:
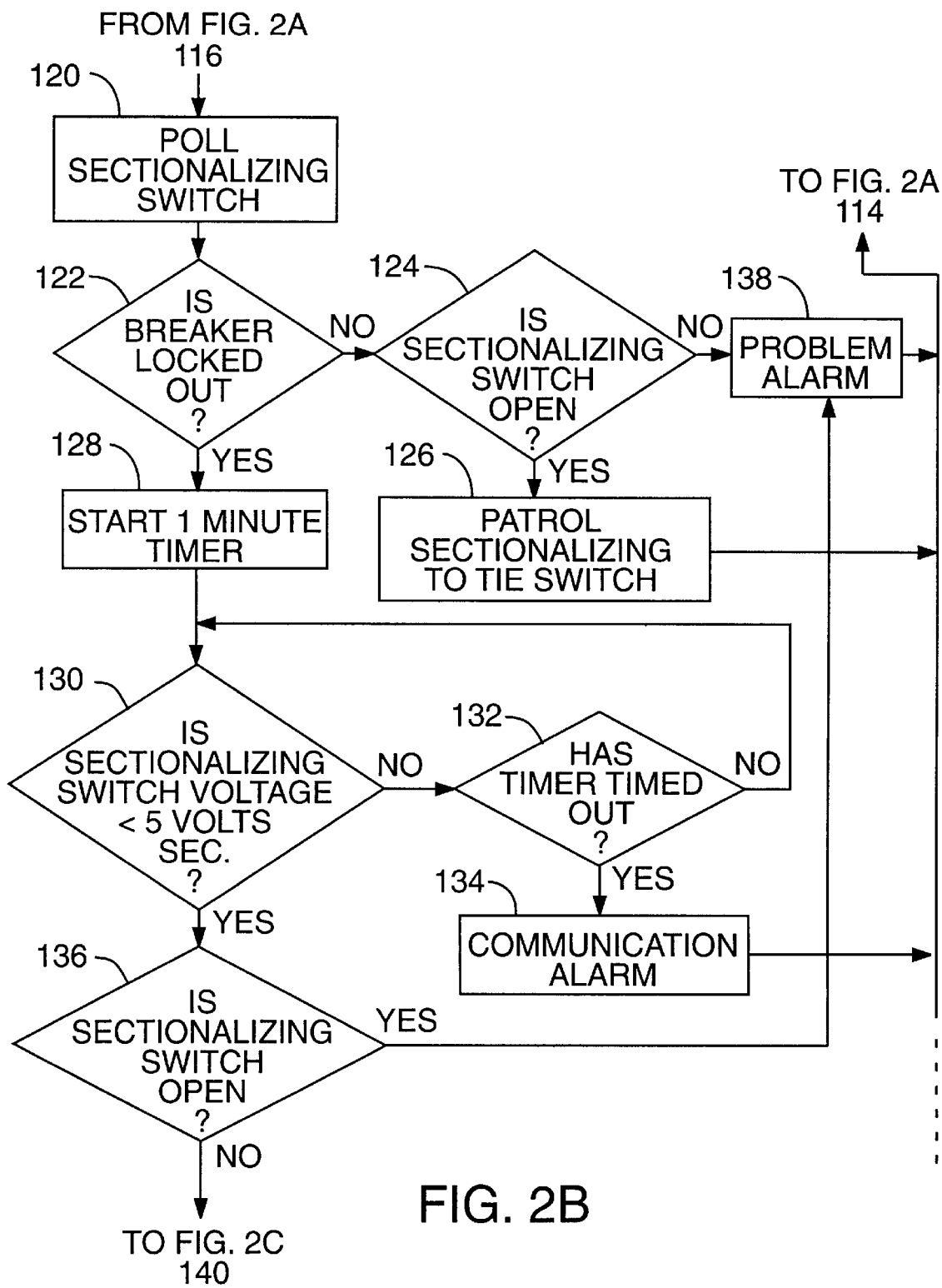

Referring now to FIG. 2B, proper operation of the next logic section depends on knowing the state and voltage of sectionalizing switch 46. Therefore, a switch status block 120 represents polling switch controller 60 to determine the voltage at sectionalizing switch 46 and whether it is opened or closed.

Then a breaker decision block 122 represents checking breaker controller 54 to determine whether circuit breaker 42 is closed or locked out.

If circuit breaker 42 is closed, a switch decision block 124 checks the data returned from switch status block 120 for the state of sectionalizing switch 46.

If sectionalizing switch 46 is open, then the fault is beyond sectionalizing switch 46, and an alarm block 126 represents informing the operator to patrol feeder 24 between sectionalizing switch 46 and tie switch 40 to locate the fault condition. In this situation, only load 28 is without power.

Referring again to breaker decision block 122, if circuit breaker 42 is locked out, it is important to determine whether communication to sectionalizing switch 46 is functioning correctly. Therefore, a voltage check is made to determine whether a no-power condition at sectionalizing switch 46 is causing a low voltage report from the switch. The voltage check verifies communication with and operation of switch controller 60.

Accordingly, if breaker decision block 122 determines that circuit breaker 42 is locked out, a timer block 128 represents starting a one-minute timer and a voltage decision block 130 represents communicating to processor 50 the voltage on sectionalizing switch 46. A timer decision block 132 keeps voltage decision block 130 active until the one-minute timer has timed out.

If during the one-minute (or other reasonable time) period, voltage decision block 130 does not report a low voltage condition, an alarm block 134 represents indicating to the operator a communication problem with switch controller 60.

However, if communication with switch controller 60 is normal, then a switch decision block 136 represents checking the state of sectionalizing switch 46. An open sectionalizing switch indicates that the fault is either beyond sectionalizing switch 46 or the switch has somehow malfunctioned. However, because circuit breaker 42 is locked out, neither scenario indicates a correct operation and, therefore, an alarm block 138 represents sending an "operational problem" alarm to the operator.

On the other hand, if voltage decision block 130 indicates a low voltage condition on sectionalizing switch 46 and switch decision block 136 indicates that sectionalizing switch 46 is closed, then the fault is located between substation 16 and sectionalizing switch 46. This means that load 28 can be energized from substation 18 if the power distribution system components between substation 18 and load 28 have the capacity to handle the additional load and if the faulted feeder section is actually isolated by opening sectionalizing switch 46.

Figure 2C:
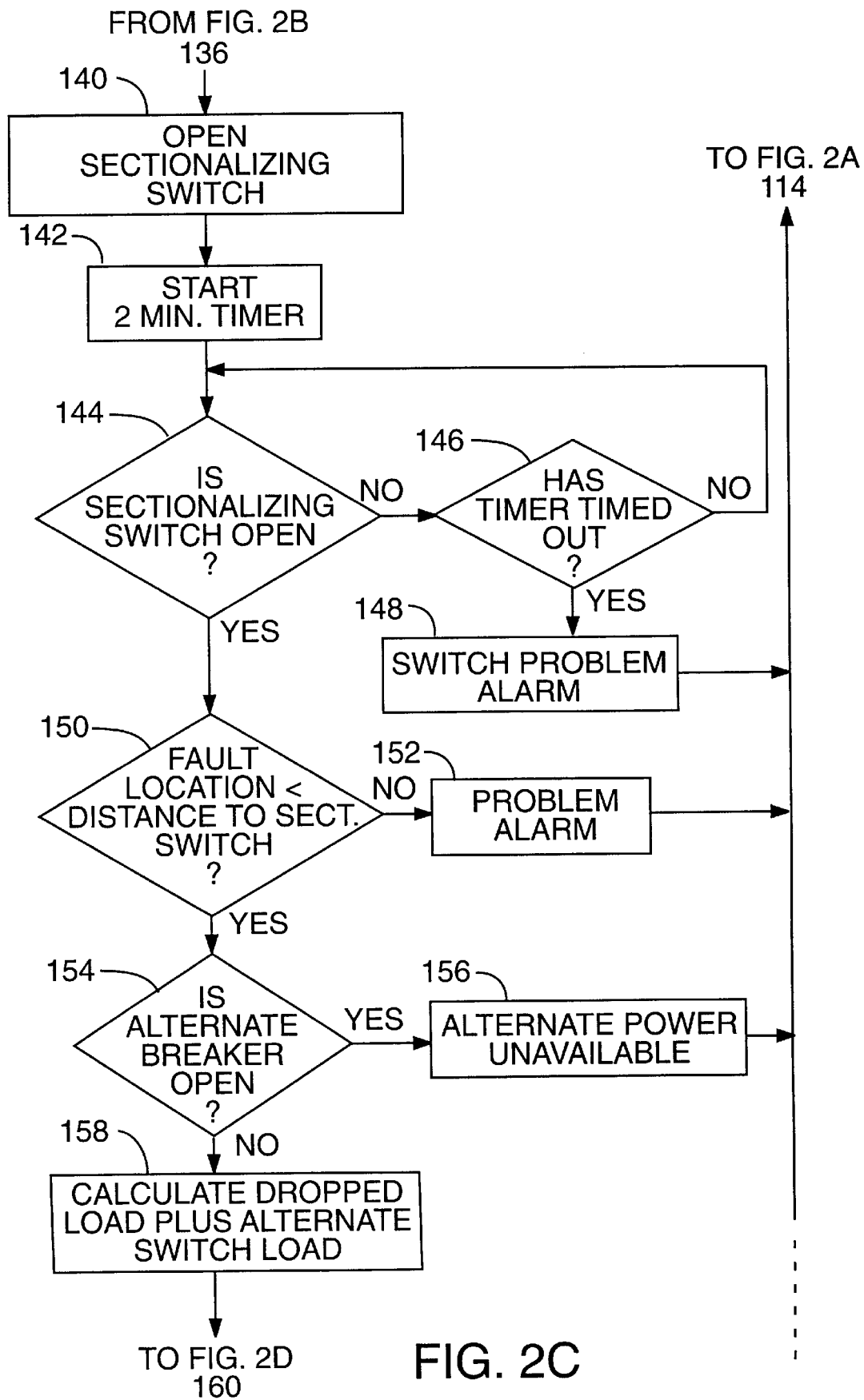

Accordingly, as shown in FIG. 2C, a switch actuating block 140 represents processor 50 instructing switch controller 60 to open sectionalizing switch 46 and verify its operation. In response, a timer block 142 represents starting a two-minute timer during which time a switch decision block 144 monitors the state of sectionalizing switch 46 until a timer decision block 146 determines that the two-minute timer has timed out. If after the two minutes sectionalizing switch 46 is still closed, an alarm block 148 represents sending a "sectionalizing switch 46 problem" alarm to the operator. Otherwise, if at any time during the two minutes sectionalizing switch 46 opens, the feeder restoration process continues to the next step.

To ensure that the fault condition is not located between sectionalizing switch 46 and tie switch 40, a distance comparison block 150 compares the known distance between circuit breaker 42 and sectionalizing switch 46 against a calculated distance from circuit breaker 42 to the fault. Breaker controller 54 determines the calculated distance by analyzing the sensed and stored current and voltage conditions that caused circuit breaker 42 to lock out. If the calculated distance to the fault is significantly greater than the known distance to sectionalizing switch 46, an alarm block 152 represents sending an "operation problem" alarm to the operator. If, however, the calculated distance to the fault is less than the known distance to sectionalizing switch 46, the faulty feeder is verified as isolated and the feeder restoration process can continue.

To determine whether substation 18 can supply power to load 28, a breaker decision block 154 represents processor 50 inquiring through processor 52 in substation 18 about the state of circuit breaker 44. If circuit breaker 44 is locked out or otherwise open, an alarm block 156 represents sending a "substation 18 unavailable" alarm to the operator. However, if circuit breaker 44 is closed, a switch capacity calculation block 158 represents adding the prefault load current through sectionalizing switch 46 and the current presenting flowing through sectionalizing switch 48 to determine whether the feeder from substation 18 to sectionalizing switch 48 can accommodate the additional current of load 28. The prefault current through sectionalizing switch 46 is known because switch controller 60 senses and processor 50 stores the current value every 20 seconds in a rotating file in which the oldest record is only five minutes old. The five-minute-old data are used as the prefault load current value.

Referring now to FIG. 2D, a capacity decision block 160 represents determining whether the sum of the load currents is less than the capacity of the ambient temperature modified capacity of feeder 32 between sectionalizing switch 48 and load 36. If feeder 34 between circuit breaker 44 and load 38 is also nearing its capacity, then it is checked. If the system capacity would be exceeded by transferring load 28 to substation 18, the feeder restoration process is aborted and an alarm block 162 represents sending a "transfer aborted" alarm to the operator. If, however, capacity decision block 160 determines that load 28 does not exceed the capacity of feeders 32 and 34, then load 28 is potentially transferrable and the feeder restoration process continues.

A load calculation block 164 represents processor 50 adding the prefault load current and the present load current flowing through circuit breaker 44 to generate a resultant load value and passing the resulting load value to a transformer capacity decision block 166 that represents determining whether the resultant load value is within the capacity of transformer 30 in substation 18. If the resultant load exceeds the capacity of transformer 30, alarm block 162 sends a "transfer aborted" alarm to the operator. Otherwise, the feeder restoration process continues.

Because closing tie switch 40 will cause a load 28 pickup current surge through circuit breaker 44, and because the three phases of tie switch 40 (only one phase shown) typically do not close at the same time, the trip open settings in breaker controller 56 need to be modified before tie switch 40 is closed to initiate the transfer. If the settings are not modified, the unbalanced current surge will trip open circuit breaker 44. Although circuit breaker 44 would reclose after a short time delay, loads 36 and 38 would experience an unnecessary and avoidable power outage. Therefore, a breaker setup block 168 represents processor 50 sending processor 52 in substation 18 an instruction to modify the trip current settings in breaker controller 56 to accommodate the unbalanced current surge.

After the circuit breaker 44 trip current setting is modified, a switch actuation block 170 represents closing tie switch 40 to transfer load 28 to substation 18.

The operation of tie switch 40 is verified by a timer block 172 that represents starting a two-minute timer, a switch decision block 174 that represents checking the state of tie switch 40, and a timer decision block 176 that represents determining whether the two-minute timer has timed out. If tie switch 40 does not close before the two-minute timer times out, an alarm block 178 represents triggering a breaker setup block 180 that represents restoring the circuit breaker 44 trip current settings to their unmodified settings and sending a "tie switch problem" alarm to the operator.

If, however, tie switch 40 closes anytime during the two-minute time period, its operation is verified and an alarm block 182 represents triggering breaker setup block 180 to restore the circuit breaker 44 trip current settings to their unmodified settings and sending a "patrol feeder 22 between substation 16 and sectionalizing switch 46" message to the operator so that the fault can be located and corrected. Triggering breaker setup block 180 also causes reset block 114 (FIG. 2A) to reset the breaker sequence counter to zero. Resetting the sequence counter prevents incorrectly repeating load restoration process blocks and returns the process to start block 100 (FIG. 2A).

Skilled workers will recognize that portions of this invention may be implemented differently from the implementation described above for a preferred embodiment. For example, processor 52 in substation 18 may employ a feeder restoration process substantially the same as the above-described process executed by processor 50 in substation 16. However, the process would be modified to exchange sectionalizing switch 48 for sectionalizing switch 46 whereby load 36 would be transferred to substation 16 through circuit breaker 42 by closing tie switch 40 in response to a permanent fault condition on feeder 34 between circuit breaker 44 and sectionalizing switch 48. Of course, the various controller identifiers would also be exchanged.

Power distribution system 10 is but one possible system configuration suitable for use with this invention. The feeder restoration process flow may be readily modified to accommodate many other configurations. For example, a configuration in which multiple sectionalizing switches are connected in series on a feeder does increase the process complexity, but the configuration is merely an extension of the above-described process. Moreover, power distribution systems having more than one alternate power source can be readily accommodated by extensions of the above-described process.

It should also be obvious that the feeder restoration process trip current, timing, counter, and other parameters can be readily adapted for use in power distribution applications having a variety of voltages, currents, loads, phases, and physical plant configurations.

It will be obvious, therefore, to those having skill in the art that many changes may be made to the details of the above-described embodiment of this invention without departing from the underlying principles thereof. Accordingly, it will be appreciated that this invention is also applicable to feeder restoration applications other than those found in commercial power distribution systems. The scope of the present invention should, therefore, be determined only by the following claims.

We claim:

1. In a power distribution system including at least a first circuit breaker that receives power from a first transformer and provides power to a first feeder section that is connected to a second feeder section by a sectionalizing switch, and a second circuit breaker that receives power from a second transformer and provides power to a third feeder section, the second and third feeder sections being interconnectable by a tie switch and the first, second, and third feeder sections providing power to respective first, second, and third loads, a method of restoring power in response to a fault on a feeder section, comprising:

sensing an overcurrent condition that causes the first circuit breaker to undergo a first opening, a first reclosing, a subsequent opening, and a subsequent reclosing;

opening the sectionalizing switch during a time period between the first and subsequent reclosings if the sectionalizing switch senses the overcurrent condition;

if the first circuit breaker locks open after the subsequent reclosing, determining whether the sectionalizing switch opened, and if it did;

determining whether the third feeder section has a capacity to carry the second and third loads, and if it can;

modifying a trip setting of the second circuit breaker to accommodate the second and third loads plus an inrush current;

closing the tie switch to transfer the second load to the second circuit breaker; and modifying the trip setting of the second circuit breaker to accommodate the second and third loads minus the inrush current.

2. The method of claim 1 further including:

determining a calculated distance from the first circuit breaker to the fault;

comparing the calculated distance and a known distance between the first circuit breaker and the sectionalizing switch; and aborting the method if the calculated distance is greater than the known distance.

3. The method of claim 1 further including:

determining a calculated distance from the first circuit breaker to the fault;

comparing the calculated distance to a known distance between the first circuit breaker and the sectionalizing switch; and continuing the method if the calculated distance is less than the known distance.

4. The method of claim 1 further including determining whether the second transformer has a capacity to carry the second and third loads, and if it can, continuing the method.

5. The method of claim 1 in which the capacity is adjusted to account for an adjusted temperature load limit of the third feeder section.

6. The method of claim 1 further including verifying during the time period between the first and subsequent reclosings whether the sectionalizing switch was closed and the tie switch was open before sensing the overcurrent condition.

7. The method of claim 1 in which if the first circuit breaker stays closed after the subsequent reclosing, determining whether the sectionalizing switch opened in response to the overcurrent condition, and if it did;

reporting that the fault is located along the second feeder section; and aborting the method.

8. The method of claim 1 in which the sectionalizing switch senses the overcurrent condition by sensing a low voltage condition during a predetermined time period.

9. The method of claim 1 in which the sectionalizing switch is normally closed and the tie switch is normally open.

10. In a power distribution system including at least a first circuit breaker that receives power from a first transformer and provides power to a first feeder section that is connected through a sectionalizing switch to a second feeder section, and a second circuit breaker that receives power from a second transformer and provides power to multiple feeder sections through multiple sectionalizing switches, the second feeder section being interconnectable by a tie switch to one of the multiple feeder sections and the first, second, and multiple feeder sections providing power to respective first, second, and multiple loads, a method of restoring power to a load in response to a fault on a feeder section, comprising:

sensing the fault and causing the first circuit breaker to undergo a first opening, a first reclosing, a subsequent opening, and a subsequent reclosing;

opening the sectionalizing switch during a time period between the first and subsequent reclosings if the sectionalizing switch senses the overcurrent condition;

if the first circuit breaker locks open after the subsequent reclosing, determining whether the sectionalizing switch opened, and if it did;

determining whether the multiple feeder sections have a capacity to carry the second load in addition to the multiple loads, and if they can;

modifying a trip setting of the second circuit breaker to accommodate the second and multiple loads plus an inrush current;

closing the tie switch to transfer the second load to the multiple feeder sections; and modifying the trip setting of the second circuit breaker to accommodate the second and multiple loads minus the inrush current.

11. The method of claim 10 further including:

determining a calculated distance from the first circuit breaker to the fault;

comparing the calculated distance to a known distance between the first circuit breaker and the sectionalizing switch; and aborting the method if the calculated distance is greater than the known distance.

12. The method of claim 10 further including:

determining a calculated distance from the first circuit breaker to the fault;

comparing the calculated distance to a known distance between the first circuit breaker and the sectionalizing switch; and continuing the method if the calculated fault distance is less than the known distance.

13. The method of claim 10 further including determining whether the second transformer has a capacity to carry the second and multiple loads, and if it can, continuing the method.

14. The method of claim 10 in which the capacity is adjusted to account for an adjusted temperature load limit of the multiple feeder sections.

15. The method of claim 10 further including verifying during the time period between the first and subsequent reclosings whether the sectionalizing switch was closed and the tie switch was open before sensing the overcurrent condition.

16. The method of claim 10 in which if the first circuit breaker stays closed after the subsequent reclosing, determining whether the sectionalizing switch opened in response to the overcurrent condition, and if it did;

reporting that the fault is located along the second feeder section; and aborting the method.

17. The method of claim 10 in which the sectionalizing switch senses the overcurrent condition by sensing a low voltage condition during a predetermined time period.

18. The method of claim 10 in which the first and multiple second sectionalizing switches are normally closed and the tie switch is normally open.

\* \* \* \* \*